No. 660,550. Patented Oct. 30, 1900.
R. BEESE.
INCANDESCENT GAS LAMP.
(Application filed Apr. 4, 1900.)
(No Model.)
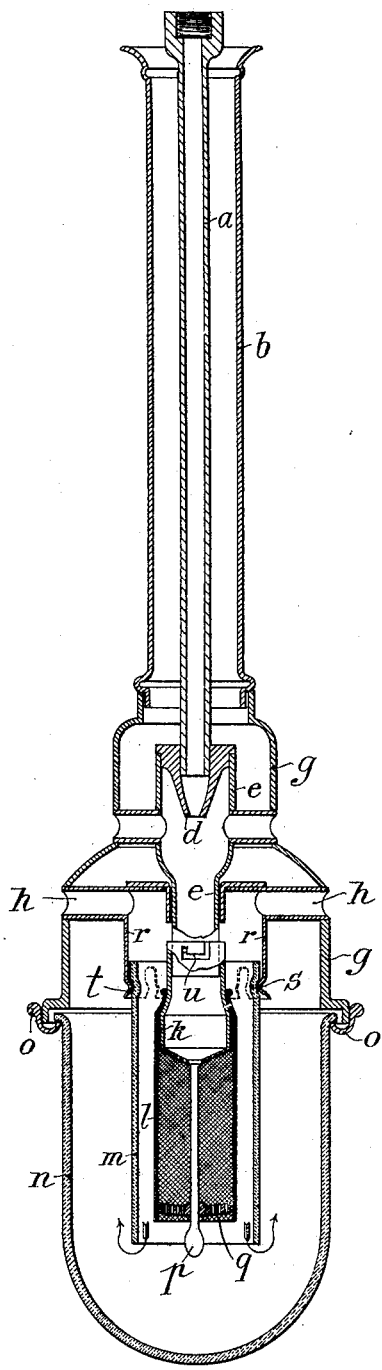
Witnesses.
Hans Brenner.
Inventor.
Richard Beese
per Gerson Sachs
his Attorneys.

UNITED STATES PATENT OFFICE.

RICHARD BEESE, OF DRESDEN, GERMANY.

INCANDESCENT GAS-LAMP.

SPECIFICATION forming part of Letters Patent No. 660,550, dated October 30, 1900.

Application filed April 4, 1900. Serial No. 11,511. (No model.)

*To all whom it may concern:*

Be it known that I, RICHARD BEESE, a subject of the King of Saxony, residing at 13 Gluckstrasse, Dresden, in the Kingdom of Saxony, German Empire, have invented new and useful Improvements in Incandescent Gas-Lamps, of which the following is a specification.

My invention relates to improvements in incandescent gas-lamps in which the flame burns from under; and the objects of my invention are, first, to provide means for leading the burned gases over the mantle in the same manner as in incandescent lamps in which the flame burns upwardly, and, second, to afford a useful manner of suspending the incandescent mantle from the head of the burner.

From the accompanying drawing, whose sole figure shows a longitudinal section of a lamp and forms a part of this specification, it will be seen that I employ an ordinary glass chimney or cylinder $m$, depending from a cylindrical closed collar $r$, as shown, and concentrically surrounding the hanging incandescent mantle or stocking $l$ to conduct the burned gases over the stocking down to the lower end of the cylinder $m$. The lamp is surrounded in the usual manner from the nozzle $d$ to the burner $k$ with a concentric body $g$, in which the mouths of the cross-tubes $h$, similar to those located in the Bunsen tube $e$, are fastened and which is secured at its lower end by a hermetical coupler $o$ to a glass bell-jar $n$. The burned gases gathering in the bell-jar pass upwardly and through the body $g$ into a waste-pipe $b$, concentrically surrounding the supply-pipe $a$, the latter having on its end the nozzle $d$, which enters the Bunsen tube $e$.

In order to suspend the glass chimney or cylinder $m$ in a sure manner, I employ a cylinder having a ring-groove $s$ near its upper end, and I provide a series of spring-acting tongues $t$ in the lower part of the collar $r$, as shown, said tongues engaging said groove and holding the chimney in position.

The manner of suspending the incandescent mantle or stocking $l$ is as follows: The stocking, which is narrowed on one end in the usual manner, is put with this narrowed end over the detachable head of the burner $k$, so as to rest upon said head, the latter being detachably secured to the Bunsen tube by means of a bayonet-catch $u$. The lower opening of the stocking $l$ is closed by means of a perforated disk $q$, of manganese, fastened to the usual supporting-rod $p$ of the upwardly-burning lamps and getting incandescent by the flame.

What I claim as my invention, and desire to secure by Letters Patent, is—

1. In an incandescent gas-lamp the combination of a downwardly-burning Bunsen flame, a stocking in connection therewith, a glass cylinder concentrically surrounding the same, a glass bell-jar inclosing said cylinder and being in air-tight connection with a waste-leading pipe for the burned gases, substantially as described.

2. In an incandescent gas-lamp the combination of a stocking $l$ suspended with its narrowed end on the head of the burner, a supporting-rod attached to the center of the burner-head and a perforated disk of manganese fastened to said rod and closing the lower opening of the stocking as and for the purpose specified.

RICHARD BEESE.

Witnesses:
 HERNANDO DE SOTO,
 PAUL ARRAS.